United States Patent [19]
Streeter

[11] Patent Number: 5,810,558
[45] Date of Patent: Sep. 22, 1998

[54] BEARING CASE SUPPORT ARRANGEMENT

[75] Inventor: Robert T. Streeter, Canisteo, N.Y.

[73] Assignee: Dresser-Rand Company, Corning, N.Y.

[21] Appl. No.: 693,439

[22] Filed: Aug. 7, 1996

Related U.S. Application Data

[63] Continuation of Ser. No. 585,489, Jan. 16, 1996, abandoned.

[51] Int. Cl.⁶ .................................................. F01D 25/26
[52] U.S. Cl. ......................................... 415/213.1; 403/335
[58] Field of Search .......................... 415/213.1; 403/335, 403/336, 337

[56] References Cited

U.S. PATENT DOCUMENTS

| | | |
|---|---|---|
| 2,879,092 | 3/1959 | Hargrove et al. ...................... 403/337 |
| 3,937,433 | 2/1976 | Portaleoni . |
| 4,407,602 | 10/1983 | Terry, Jr. .................................. 403/336 |
| 4,716,721 | 1/1988 | Pask et al. ............................. 415/213.1 |
| 4,771,644 | 9/1988 | Meron . |
| 5,012,948 | 5/1991 | Van Den Bergh . |
| 5,035,396 | 7/1991 | Krum et al. . |
| 5,040,973 | 8/1991 | Matter et al. . |
| 5,090,198 | 2/1992 | Nightingale et al. . |
| 5,100,291 | 3/1992 | Glover . |
| 5,133,641 | 7/1992 | Groenendaal, Jr. et al. ......... 415/213.1 |
| 5,220,854 | 6/1993 | Allart et al. ............................. 403/337 |
| 5,267,798 | 12/1993 | Budris . |
| 5,271,685 | 12/1993 | Stark ...................................... 403/337 |
| 5,273,249 | 12/1993 | Peterson et al. . |
| 5,509,782 | 4/1996 | Streeter . |

FOREIGN PATENT DOCUMENTS

| | | |
|---|---|---|
| 89 10 279.7 | 2/1991 | Germany . |
| 426886 | 6/1967 | Switzerland . |
| 777598 | 6/1957 | United Kingdom . |
| 913375 | 12/1962 | United Kingdom . |
| 2284148 | 5/1995 | United Kingdom . |

*Primary Examiner*—John T. Kwon
*Attorney, Agent, or Firm*—Nixon, Hargrave, Devans & Doyle LLP

[57] ABSTRACT

The present invention relates to turbomachines and to a support for the bearing casing used in such machines. One end of a turbomachine housing is rigidly supported by a support member while the second end is supported by the inboard end of a bearing case. The inboard end of the bearing case is supported by an inboard support which permits horizontal movement of the bearing case in a direction parallel to the turbomachine shaft. The outboard support has a flange on which the bearing case rests and a base connected to and positioned below the flange. The flange contains flange bores through which rods attached on their first end to and protruding downwardly from the bearing case pass. The rods are optionally prevented from moving upwardly through the flange bore by a retainer, such as a nut or nut and washer combination, which is attached to the rod's second end. The retainer is mounted on the rod so that a gap is created between the upper surface of the retainer and the bottom surface of the flange. The support can further include a spacer mounted on the rod inside the flange bore and fitted between the retainer and the bearing case. The spacer has a length greater than the thickness of the flange and, thus, defines the size of the gap. The gap permits limited upward vertical movement of the bearing case. In this manner, the outboard support element maintains the alignment of the bearing case with the turbine shaft during operation of the turbomachine at elevated temperatures when differential heating of the supports causes them to undergo unequal vertical expansion.

20 Claims, 9 Drawing Sheets

BEARING CASE SUPPORT ARRANGEMENT

This application is a continuation of application Ser. No. 08/585,489, filed Jan. 16, 1996, now abandoned.

FIELD OF THE INVENTION

This invention relates to a turbomachine having a bearing case supported so that the orientation of the bearing case with respect to the turbomachine shaft does not change despite temperature changes occurring during operation of the turbomachine and differential heating of the supporting apparatus.

BACKGROUND OF THE INVENTION

Turbines which are utilized with hot fluids experience dimensional changes during the operation of the turbine as a result of substantial temperature changes in the components of the turbine. For example, during operation, portions of a steam turbine can reach temperatures which are sufficiently elevated that the elongated components, such as the turbine shaft and the turbine case, experience substantial increases in their length. As a result, this must be taken into account in designing the mechanical support for the turbine. One technique has been to provide a bearing case at one end of the turbine shaft, with the bearing case being mounted on flexible supports, while the other end of the turbine shaft is mounted on fixed supports. In one such system, each of the four corners of the bearing case is mounted on a flex plate support having one or more vertical plates which provide vertical support, but which flex relatively easily in a direction parallel to the longitudinal axis of the turbine shaft. However, the inboard end of the bearing case, i.e., adjacent to the turbine casing, experiences operating temperatures which are substantially higher than the operating temperatures of the outboard end of the bearing case, i.e., remote from the turbine casing. This difference in operating temperatures results in the two flex plate supports at the inboard end of the bearing case experiencing greater thermal expansion than the two flex plate supports at the outboard end of the bearing case. This causes the elevation of the inboard end of the bearing case to become higher than the elevation of the outboard end of the bearing case, resulting in a deviation in the orientation of the bearing case with respect to the longitudinal axis of the turbine shaft. This deviation in orientation can cause severe damage to the bearings as well as to other parts which become misaligned with the turbine shaft as a result of the deviation.

Accordingly, there is a need for providing for axial expansion of a turbomachine during operation while avoiding deviations in the orientation of the turbine shaft with respect to the support bearings for the turbine shaft, and to other components positioned by the bearing case.

SUMMARY OF THE INVENTION

The present invention relates to a support for a weight. The support includes a flange having a flange bore with a flange bore width. The support also includes a base connected to and positioned below the flange and a rod having a diameter less than the flange bore width. The rod has a first end attached to the weight and a second end protruding downwardly from the weight's bottom surface and through the flange bore so that the flange is moveable relative to the weight.

The invention also relates to a turbomachine. The turbomachine includes a housing containing a rotor with a longitudinally-extending shaft and a bearing case containing a bearing to support the shaft and positioned adjacent to the housing. The turbomachine also includes a support system positioned beneath the bearing case. The support system includes a flange which supportingly contacts the bearing case. The flange contains a flange bore which has a flange bore width. The support system also includes a base connected to and positioned below the flange and a rod having a diameter less than the flange bore width. The rod has a first end attached to the bearing case and a second end protruding downwardly from the bearing case and through the flange bore, thus permitting movement of the flange relative to the bearing case.

Using the supports of the present invention, tipping of the supported weight resulting from differential thermal expansion of the supports can be significantly reduced. This is particularly important where the weight being supported is a bearing case which supports a longitudinal shaft, such as those employed in turbomachines.

DETAILED DESCRIPTION OF THE INVENTION

Figure 1:
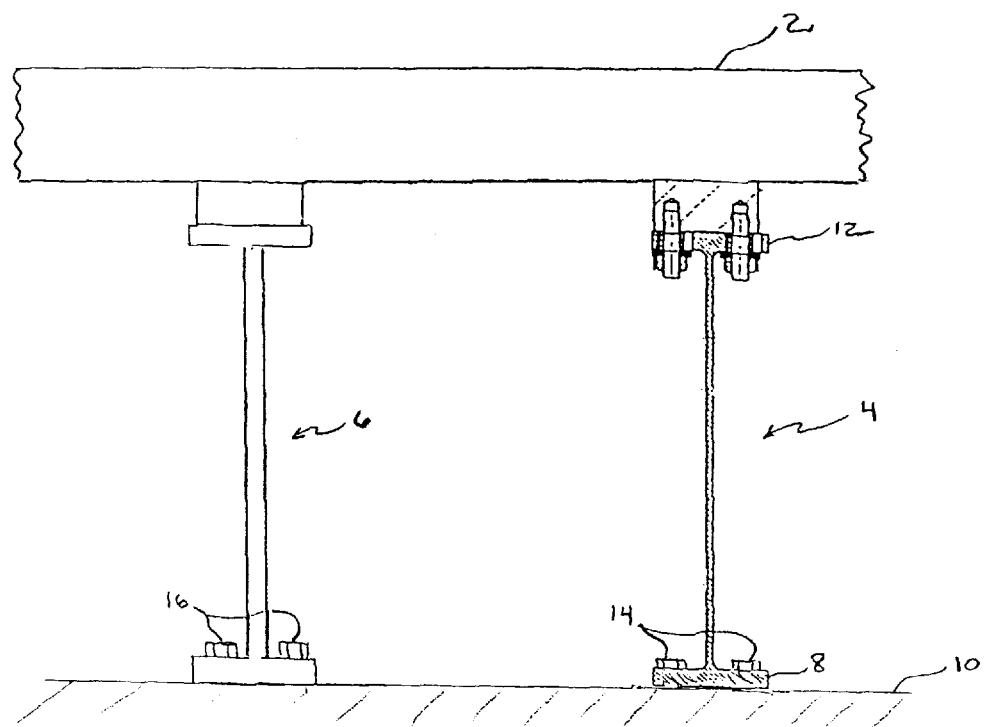
FIG. 1 is a side view of a support system for a weight according to the present invention.

FIG. 1 is a side view of a support system for a weight 2. The support system contains a plurality of supports at least one of which is sliding support 4 according to the present invention. One or more rigid supports 6 can optionally be used in conjunction with sliding support 4.

Sliding support 4 comprises base 8 which is connected to and positioned below flange 12. Base 8 is preferably rigidly attached, such as with bolts 14, to foundation 10. Rigid supports 6, when employed in the support system, are also rigidly attached to foundation 10, such as with bolts 16. Sliding support 4 is positioned toward the end of weight 2 where conditions tend to cause minimum vertical expansion or maximum vertical contraction of the support. Thus, for example, when rigid support 6 expands, such as when it is differentially heated relative to sliding support 4, sliding support 4 permits vertical movement of weight 2 relative to foundation 10 rather than restricting its vertical movement, as would be the case if support 4 were a rigid support, like support 6.

Figure 2:
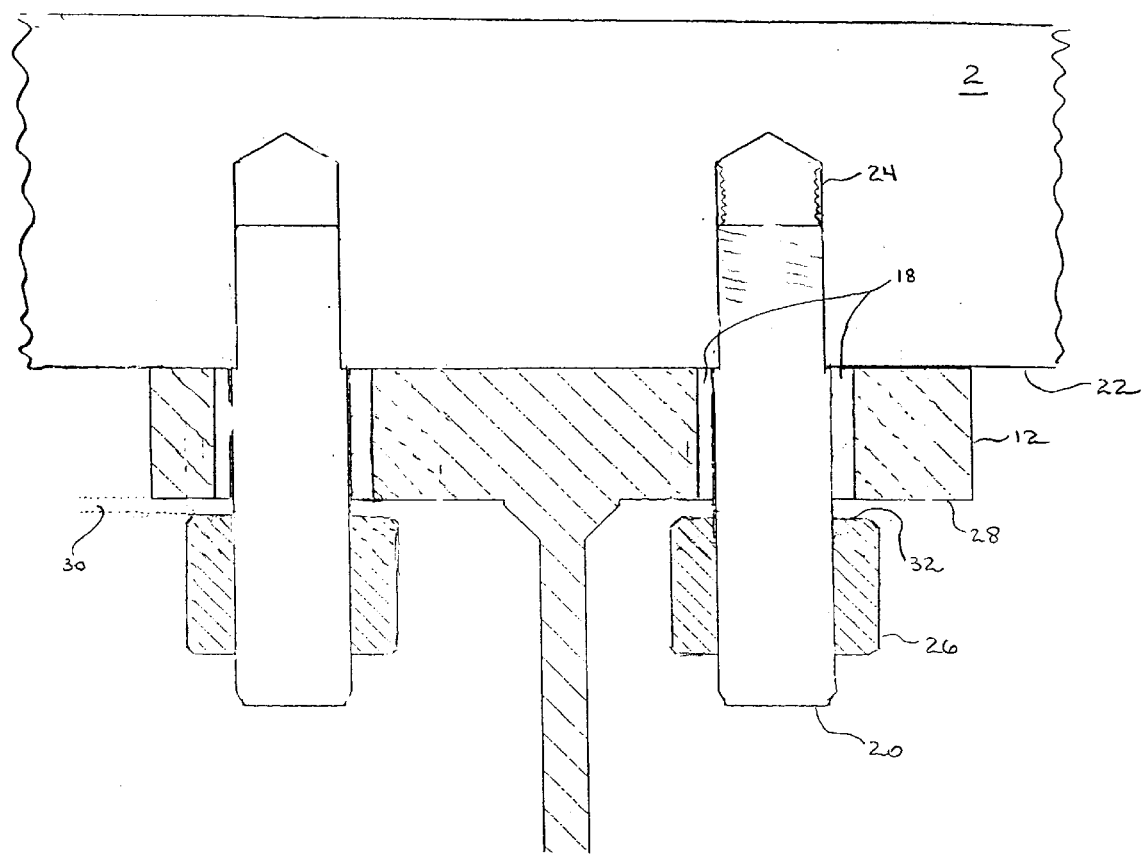
FIG. 2 is an enlarged side cross-sectional view of the upper portion of the support system of FIG. 1.
Figure 5:
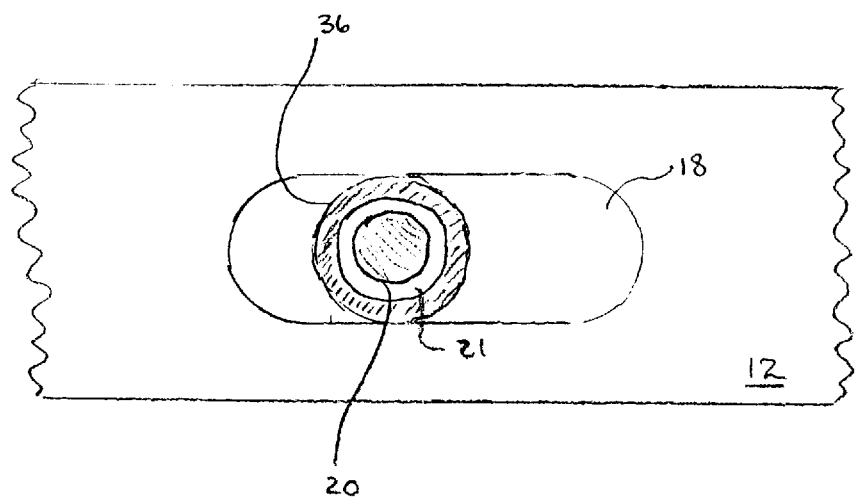
FIG. 5 is a top cross-sectional view of a support in accordance with the present invention taken along line A—A of FIG. 4.

As shown in FIG. 2, flange 12 has flange bore 18 (or a plurality of flange bores 18). The cross-sectional shape of flange bore 18 is not critical; suitable shapes include circular, square, rectangular, oval, or elongated (as depicted in FIG. 5). The flange bore has a flange bore width equal to the diameter of the largest possible circle inscribed in the cross-section of flange bore 18. Support 4 further comprises rod 20 having a diameter less than the flange bore width. Rod 20 has a first end which is attached to weight 2's bottom surface 22 and a second end protruding downwardly from weight 2's bottom surface 22 and through flange bore 18. Rod 20 can be attached to weight 2's bottom surface 22 by any means which rigidly fixes rod 20 and weight 2. In the embodiment depicted in FIG. 2, weight 2 contains tapped hole 24 into which rod 20, threaded on its first end, is screwed. Other suitable ways for attachment include welding, brazing, soldering, gluing, epoxying, press fitting, and casting or machining weight 2 so that rod 20 is an integral part of weight 2.

Figure 3:
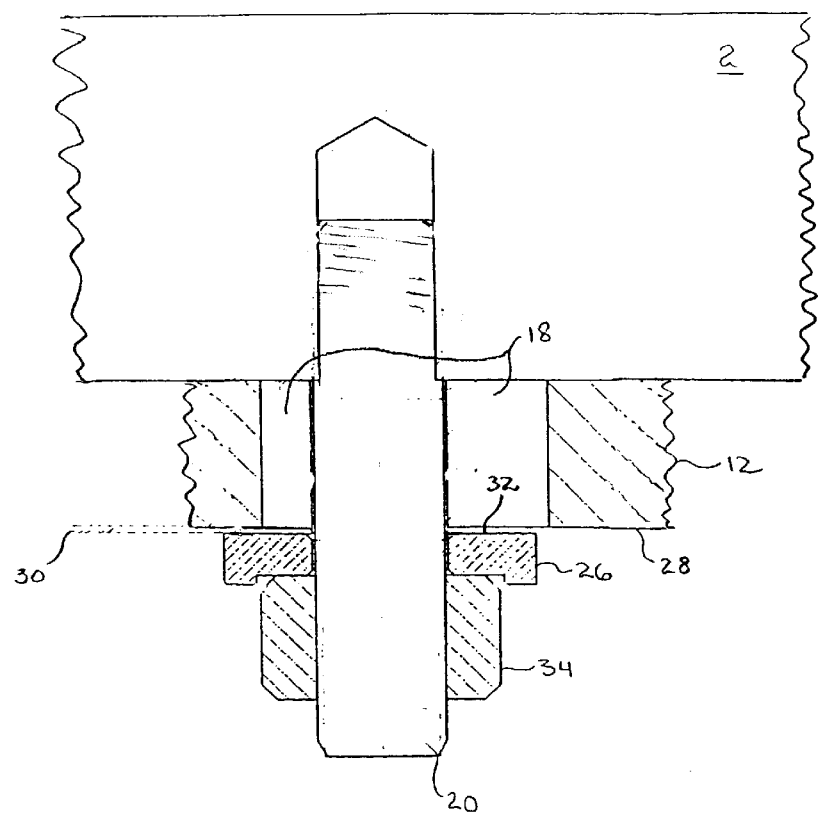
FIG. 3 is an enlarged side cross-sectional view of an alternative embodiment of a retainer having a configuration in accordance with the present invention.
Figure 4:
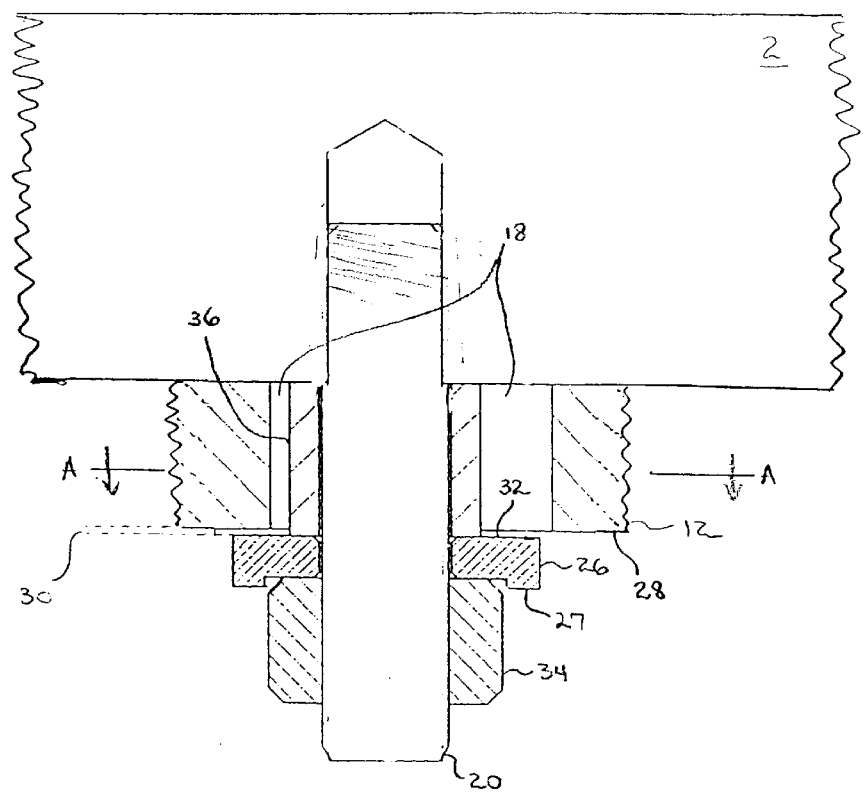
FIG. 4 is an enlarged side cross-sectional view of an alternative embodiment of the support in accordance with the present invention.

As shown in FIGS. 2–4, support 4 can optionally further comprise retainer 26 attached to the second end of rod 20. Retainer 26 has a shape and is positioned so that it cannot pass vertically upward through flange bore 18. Retainer 26 is also positioned so that, in the absence of differential heating of the supports, it does not contact flange 12's bottom surface 28 but rather forms gap 30 between retainer 26's top surface 32 and flange 12's bottom surface 28. In this arrangement, gap 30 permits weight 2 to lift off flange 12 when sliding support 4 expands less than or contracts more than other supports in the support system, such as, for example, rigid support 6. Gap 30 is sized based on the expected amount of differential contraction or expansion of the supports. If, unexpectedly, a greater amount of vertical movement of weight 2 occurred (such as an unexpectedly large degree of differential expansion or contraction of the supports), retainer 26 would prevent such excessive vertical movement of weight 2.

In FIG. 2, retainer 26 is depicted as a threaded nut which is threaded onto the second end of rod 20, which is likewise threaded. Threaded nut 26 has an outside diameter greater than the width of flange bore 18 to prevent passage of threaded nut 26 vertically upward through flange bore 18. As one skilled in the art will appreciate, however, there are a variety of ways to attach retainer 26 to rod 20, including welding, brazing, soldering, gluing, epoxying, press fitting, and casting or machining rod 20 so it is integral with retainer 26.

In another embodiment, depicted in FIG. 3, retainer 26 can be a washer. In this case, washer 26 has an outside diameter greater than the width of flange bore 18 so that passage of washer 26 vertically upward through flange bore 18 is restricted. Washer 26 is mounted on rod 20 in a position to form gap 30 and is held there in position by threaded nut 34, which is likewise mounted on rod 20. Nut 34 can be replaced with any means for fixing the position of washer 26 on rod 20, such as, for example, a cotter pin or similar device passing radially through rod 20, a clevis pin or similar device secured in a groove cut circumferentially in rod 20, or a friction fit cap fitted on the second end of rod 20.

As shown in FIG. 4, support 4 of the present invention can optionally further comprise spacer 36 mounted on rod 20 and inside flange bore 18. Spacer 36 is fitted between retainer 26 and weight 2 and has a length greater than the thickness of flange 12. Spacer 36 is preferably clamped against weight 2 by retainer 26. When, as depicted in FIG. 4, retainer 26 is a washer held in position by threaded nut 34 mounted on rod 20, spacer 36 can be clamped against weight 2 by tightening threaded nut 34. As one skilled in the art will note, the difference between the length of spacer 36 and the thickness of flange 12 defines the size of gap 30. In this manner, use of spacer 36 permits precise sizing of gap 30.

As depicted in FIG. 5, which presents a cross section taken across line A—A in FIG. 4, spacer 36 can be of any shape or width, so long as it fits in the annular space defined by flange bore 18 and rod 20. Conveniently, spacer 36 can have a circular cross-section having an inside diameter greater than the diameter of rod 20 to form gap 21 and having an outside diameter less than the width of flange bore 18.

The design of support 4 permits vertical upward movement of weight 2 relative to flange 12 to the extent allowed by retainer 26. In operation, if vertical growth of another support (e.g. rigid support 6) were to cause vertical movement of weight 2, support 4 would permit weight 2 to lift off flange 12. In this manner, the orientation of weight 2 relative to foundation 10 is not changed by the expansion of other supports (e.g., rigid support 6) in the support system.

The design of support 4 has an additional advantage. Since flange 12 is not clamped to weight 2, to the extent that the diameter of rod 20 (or in the case where spacer 36 is used, to the extent that the outside diameter of spacer 36) is less than the width of flange bore 18, horizontal movement of weight 2 relative to support 4 is not resisted by support 4, except by sliding friction. The amount of unrestrained horizontal movement of weight 2 can be controlled by varying the diameter of rod 20, the diameter of spacer 36, the cross-sectional shape and dimensions of flange bore 18, or combinations of these. When one component of horizontal movement is desired but the perpendicular horizontal component is preferably restrained, flange bores 18, elongated in the direction of the desired horizontal movement, such as those depicted in FIG. 5, can be used.

Although all of the aforementioned figures have shown weight 2 mounted on flange 12 by one or two rod and flange bore pairs, as one skilled in the art will recognize, the inventions depicted therein can be practiced with any number of rod and flange bore pairs. Preferably flange bores 18 are distributed evenly about flange 12 to disperse the potential upward force of retainers 26 on flange 12 in the event of unexpected upward vertical movement of weight 2.

Furthermore, the depiction in FIG. 1 of two supports is not to be construed as a limitation. Nor is it intended that FIG. 1's having only one sliding support have significance other than as an illustrative example. The number and arrangement of sliding and rigid supports, is generally dictated by the application to which the support system is to be put. Typically an arrangement of three or four supports is preferred, typically placed at the corners of the weight being supported. In some cases, only one or two of these need be the sliding supports of the present invention. Generally, a minimum of one sliding support is needed in systems employing three supports. The minimum number of sliding supports for systems employing four supports is two.

The supports of the present invention are particularly useful to support turbomachines, as described below.

Figure 6:
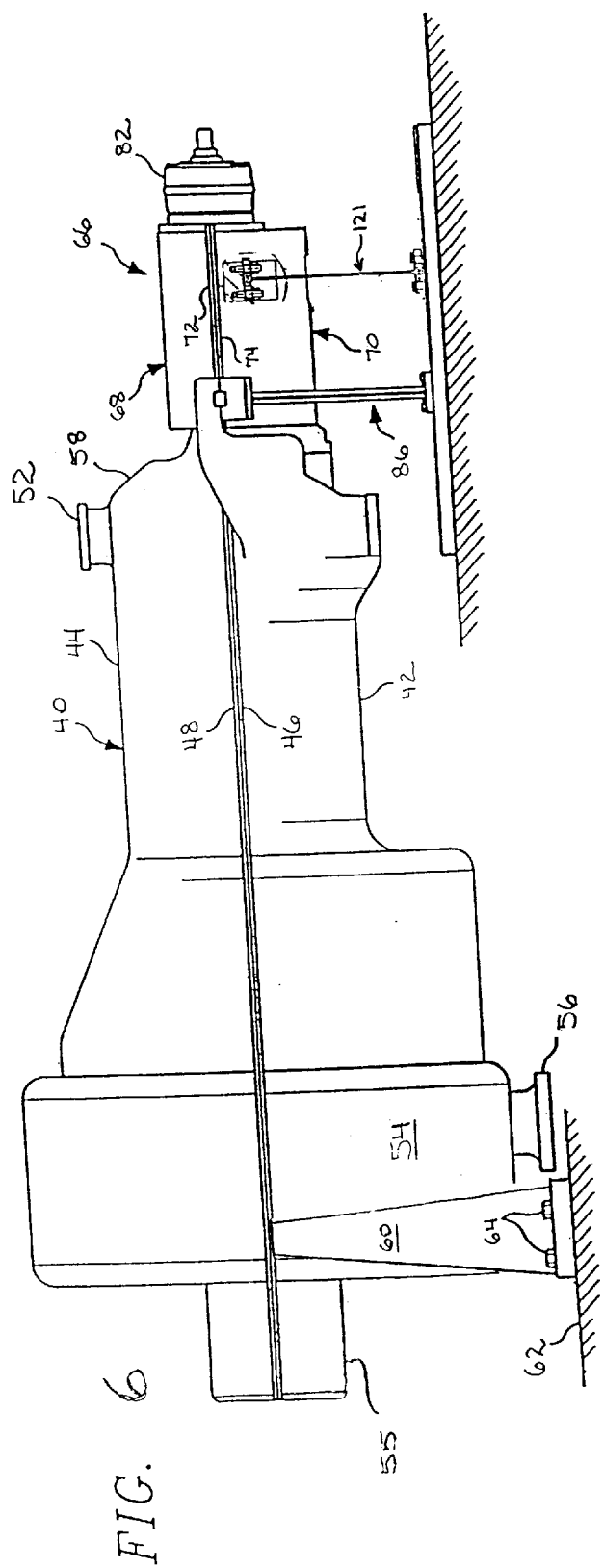
FIG. 6 is a side view of a turbomachine in accordance with the present invention.
Figure 9:
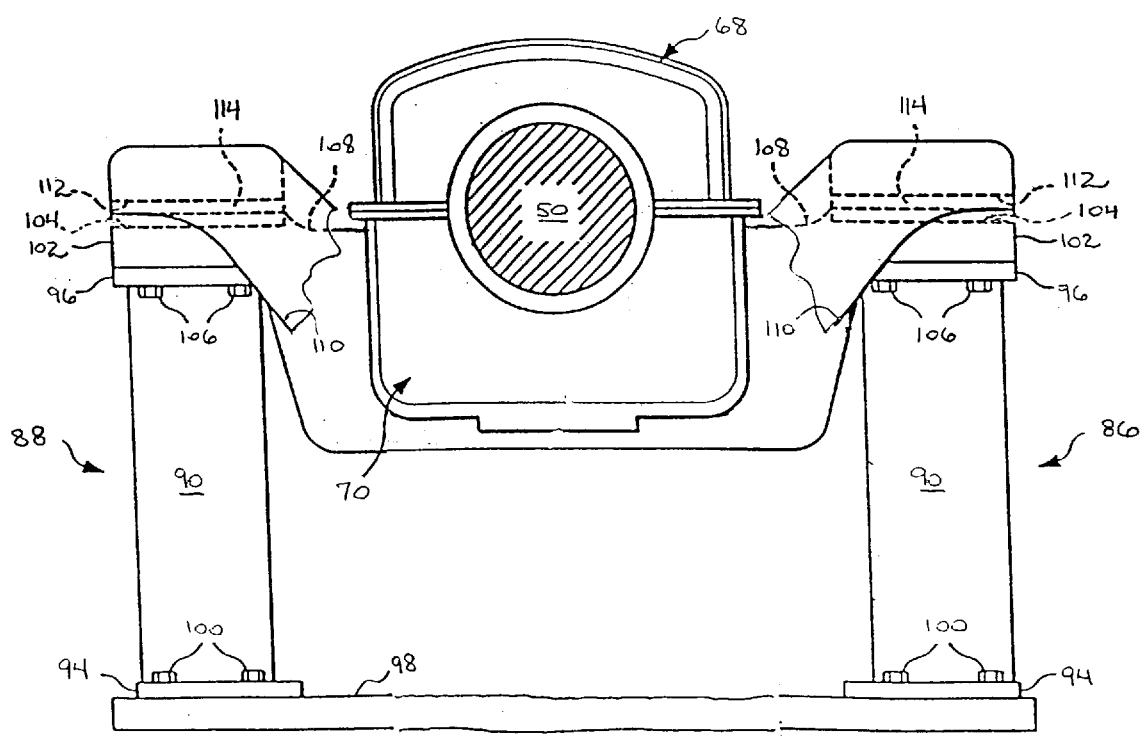
FIG. 9 is an inboard end view of the bearing case of FIG. 7.

FIG. 6 is a side view of a turbomachine according to the present invention. The turbomachine has a housing 40 which includes lower half housing 42 and upper half housing 44 joined together along their mating laterally extending flanges 46 and 48 to enclose longitudinally-extending shaft 50 (shown in FIG. 11) and other internal turbine components (not shown) including a rotor (not shown) axially connected with shaft 50 (shown in FIGS. 9 and 11). High pressure steam inlet 52 is provided in the first or high pressure inlet end portion 58 of the housing 40, while a low pressure exhaust steam outlet 56 is provided in the second or low pressure exhaust end portion 54 of housing 40. Exhaust end portion 54 of lower half housing 42 is rigidly supported by a pair of vertical supports 60 located on opposite sides of lower half housing 42 and fixed to foundation 62 by bolts 64. Inlet end portion 58 of housing 40 is supported via bearing case 66 so that any increase in the length of housing 40 along the longitudinal axis of shaft 50 is accommodated by the flexibly supported bearing case 66.

Figure 11:
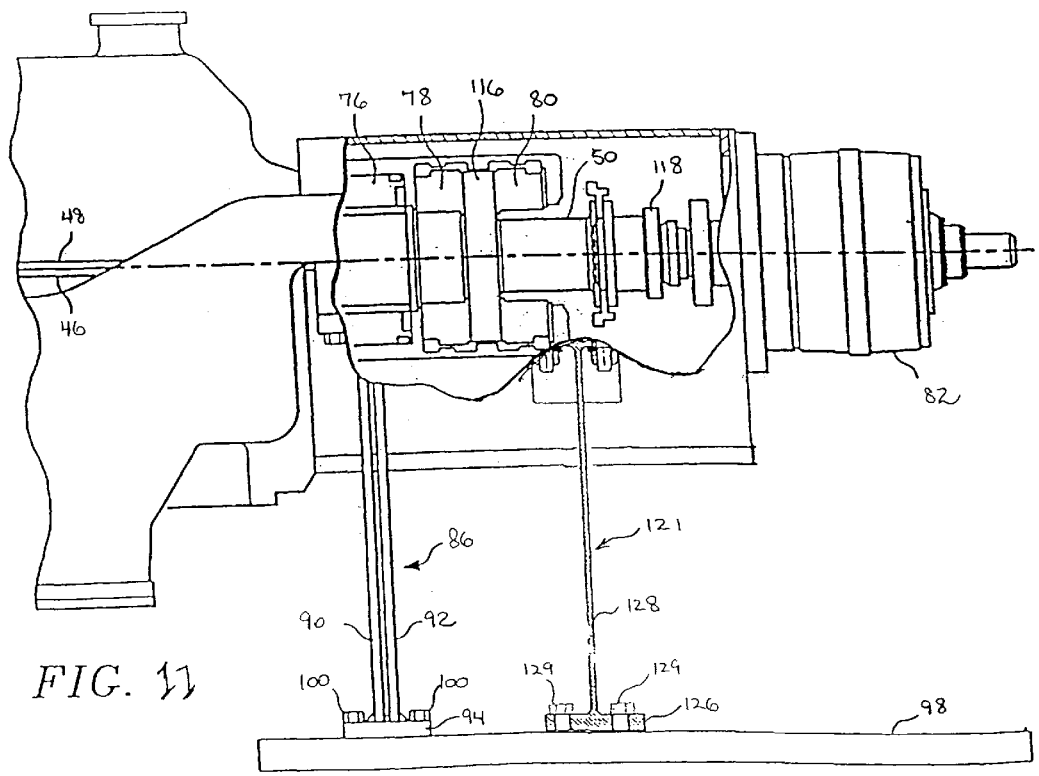
FIG. 11 is a partial cross-sectional view of the bearing case along a vertical plane containing the shaft axis.

Bearing case 66 has an upper half case 68 and a lower half case 70 joined together along their mating laterally extending flanges 72 and 74 to enclose a suitable journal bearing 76 and thrust bearings 78 and 80 for shaft 50 as well as at least substantially enclosing an end portion of the shaft 50 (shown in FIG. 11). A turning gear mechanism 82 can be mounted on the end of bearing case 66 remote from the turbine housing 40. Turning gear mechanism 82 can be utilized to engage shaft 50 for rotation of shaft 50 at a low rate during startup operations and also during cool down operations after the turbomachine components have been heated to elevated operating temperatures, in order to avoid distortions in shaft 50 and the other rotary components.

As shown in FIGS. 7–10, inboard end portion 84, which is the end portion of bearing case 66 closest to turbine housing 40, is mounted on a pair of inboard supports 86 and 88. Each of inboard supports 86 and 88 comprises two vertically extending plates 90 and 92 having their lower ends secured to lower mounting plate 94 and their upper ends secured to upper mounting plate 96. The lower mounting plate 94 is fixed to foundation 98 by bolts 100. Two inboard lugs 102 extend horizontally outwardly from opposite sides of inboard end portion 84 of lower half bearing case 70, with each inboard lug 102 being positioned on the top surface of a respective upper mounting plate 96. The upper surfaces of inboard lugs 102 are in a horizontal plane which also contains the longitudinal axis of shaft 50. Each inboard lug 102 has keyway 104 formed in its upper surface, with keyway 104 extending radially outwardly from the longitudinal axis of shaft 50. Each upper mounting plate 96 is secured to the respective inboard lug 102 by bolts 106. Each inboard lug 102 represents the distal end of a support arm 108 which is part of lower half bearing case 70. A pair of arms 110 extend outwardly from the inlet end of lower half housing 42 to rest on inboard lugs 102. A keyway 112 is formed in the lower surface of each of arms 110 so that a key 114 is received within mating keyways 104 and 112. Key 114 maintains the alignment of the inboard lug 102 and arm 110 in a direction substantially parallel to the longitudinal axis of shaft 50, while permitting relative movement between arm 110 and inboard lug 102 in a direction radial to the longitudinal axis of shaft 50.

Inlet end portion 58 of housing 40 is supported by the inboard end portion 84 of bearing case 66 at the machine centerline, i.e., the horizontal line extending through the longitudinal axis of shaft 50. This centerline support of the turbine housing 40 means that the centerline of the turbine housing 40 will remain coincident with the centerline of shaft 50 as temperature changes occur. Since any alteration of the relationship between housing 40 and shaft 50 is avoided, there is no need to have other means of moving housing 40 in the vertical direction to maintain a proper vertical relationship between housing 40 and shaft 50 when temperature changes occur.

Each of plates 90 and 92 is positioned with its width being substantially perpendicular to the longitudinal axis of shaft 50, while the thickness of each of plates 90 and 92, which extends parallel to the longitudinal axis of shaft 50, is substantially smaller than the width of each of plates 90 and 92. Plates 90 and 92 have enough strength to provide vertical support of bearing case 66 and inlet end portion 58 of housing 40, but the thickness of each of plates 90 and 92 is such that plates 90 and 92 will flex relatively readily in a direction parallel with the longitudinal axis of shaft 50, so that changes in the length of housing 40, resulting from exposure thereof to hot fluid, are readily accommodated by such flexing of plates 90 and 92. While each inboard support 86 and 88 is illustrated as being formed of two flex plates 90 and 92, each inboard support 86 and 88 can be formed of a single flex plate or of three or more flex plates. Any suitable means, e.g., welding, can be employed to secure the ends of flex plates 90 and 92 to lower mounting plate 94 and to upper mounting plate 96.

As shown in FIG. 11, bearing case 66 contains an annular journal bearing 76, e.g., a tilt pad bearing, a sleeve bearing, etc., which surrounds and is concentric to turbine shaft 50 to provide radial bearing support for shaft 50. Thrust collar 116 extends radially outwardly from shaft 50 and is positioned between annular thrust bearings 78 and 80, also located in bearing case 66. Thrust collar 116 moves with bearing case 66 as turbine housing 40 grows/shrinks longitudinally due to temperature changes. Clutch 118 is positioned to engage/disengage the end of shaft 50 with turning gear mechanism 82.

While the inboard support elements have been illustrated as flex plate supports, any other known support element, suitable for permitting axial movement of the bearing case, can be employed.

Figure 7:
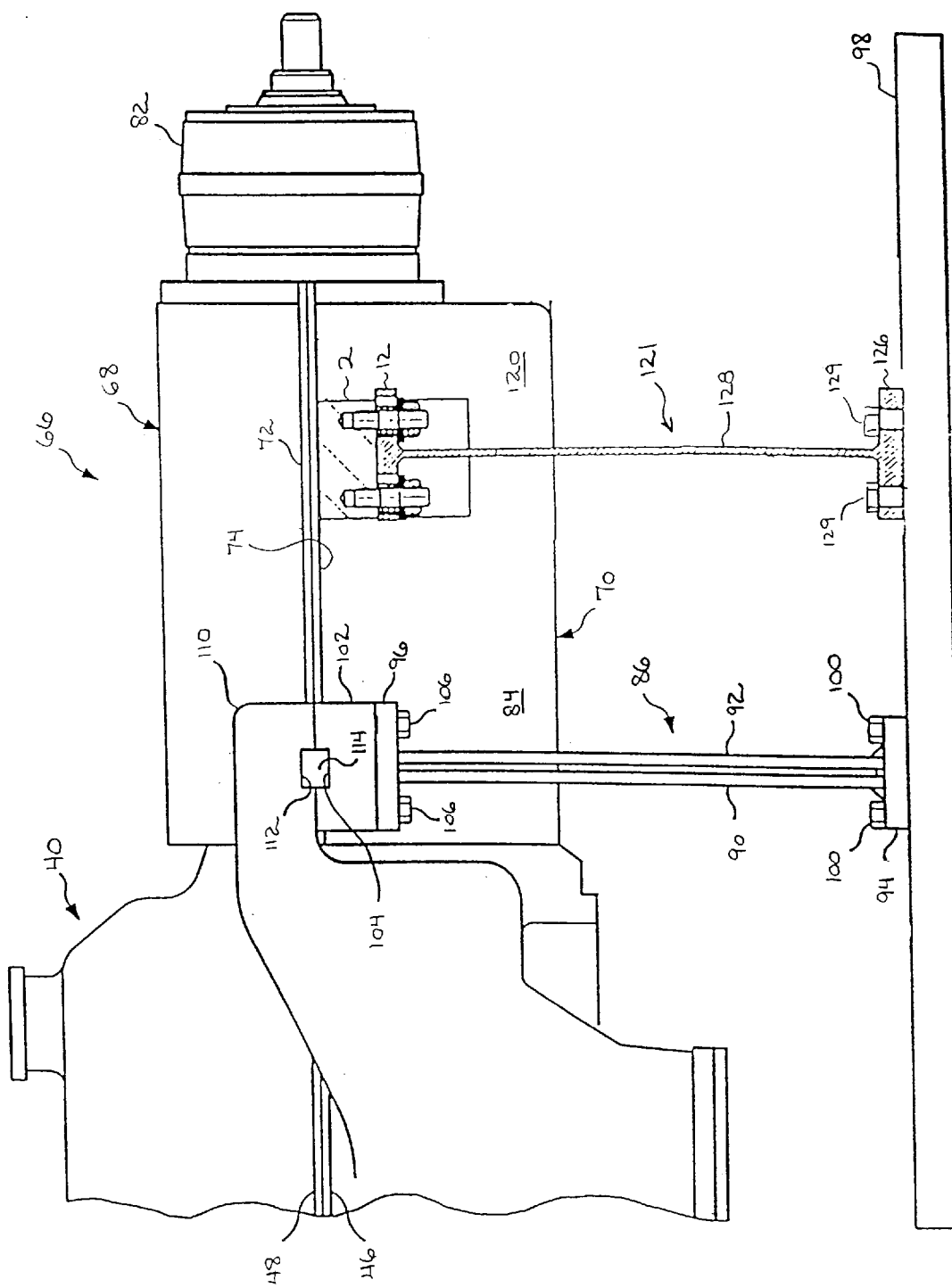
FIG. 7 is an enlarged side view of the turbomachine of FIG. 6 in accordance with the present invention showing the bearing case and its supports.
Figure 8:
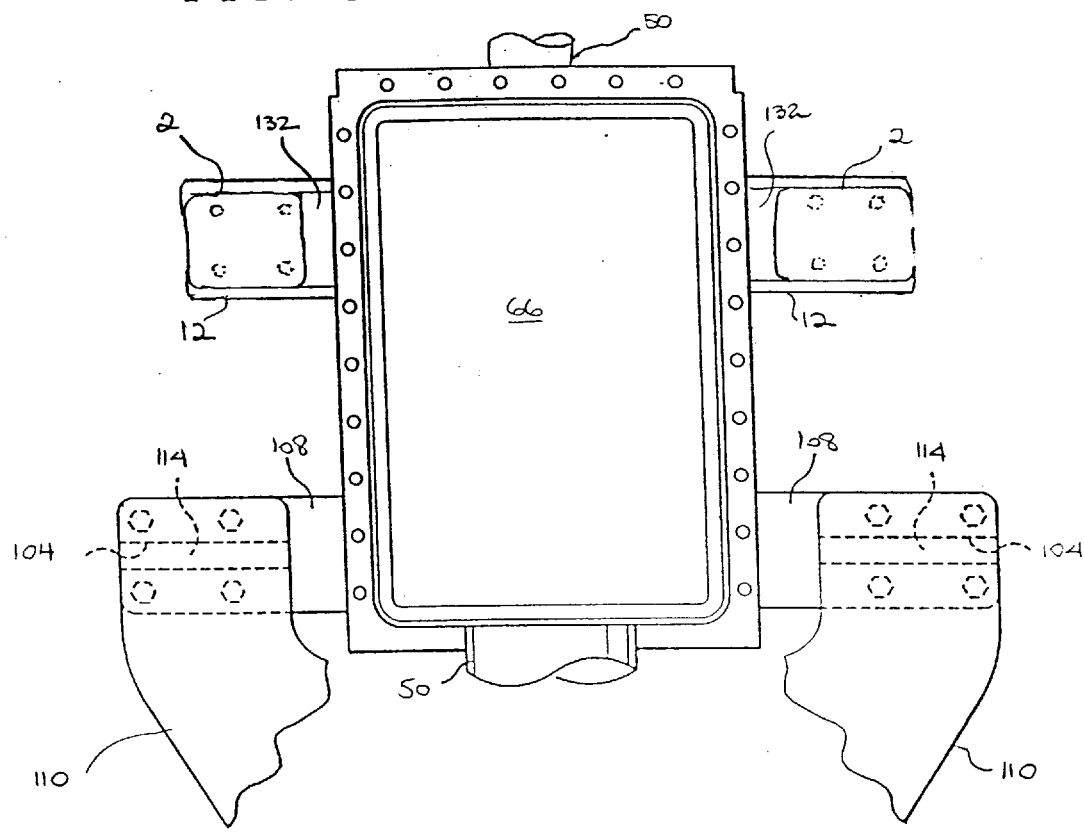
FIG. 8 is a top view of the bearing case of FIG. 7 with the turning gear mechanism omitted for clarity.
Figure 10:
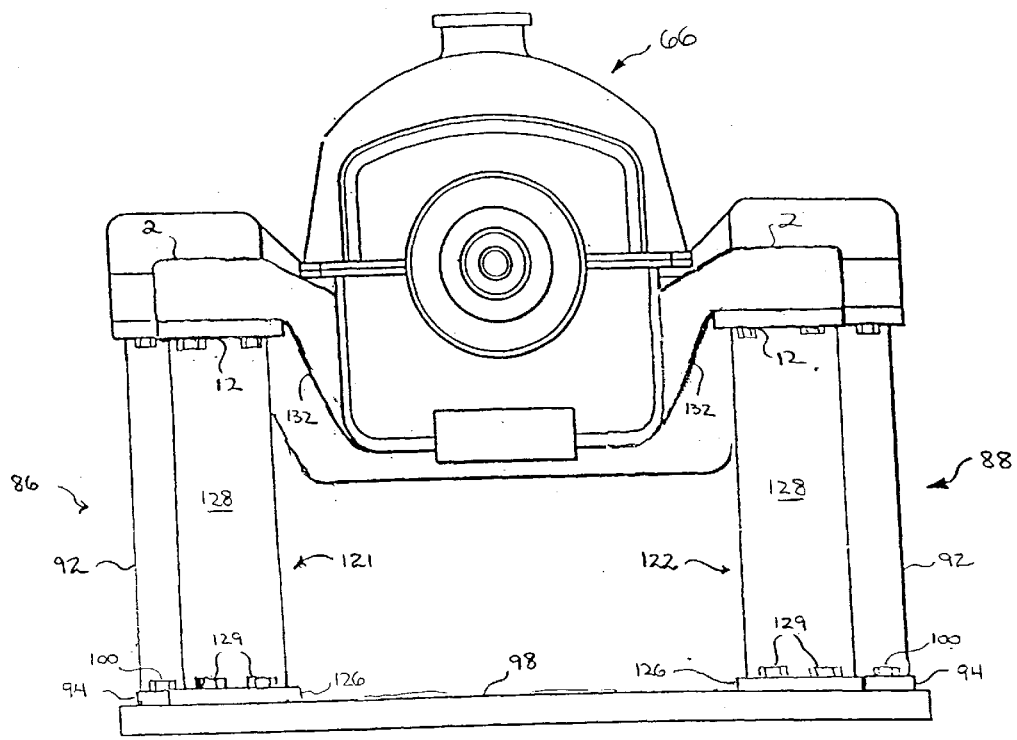
FIG. 10 is an outboard end view of the bearing case of FIG. 7.

As shown in FIGS. 7, 8, and 10, outboard end portion 120 of bearing case 66, which is the end portion of bearing case 66 remote from housing 40, is supported on a pair of outboard supports 121 and 122. Each of outboard supports 121 and 122 comprises flange 12 and base 126. Flange 12 and base 126 are connected by a vertically extending outboard vertical support member 128, the lower end of which is secured to base 126 and the upper end of which is secured to flange 12. Base 126 is fixed to foundation 98 by bolts 129. Two outboard lugs 2 extend horizontally outwardly from opposite sides of outboard end portion 120 of the lower half bearing case 70, with each outboard lug 2 in contact with and supported by the top surface of flanges 12. Each outboard lug 2 represents the distal end of outboard support arm 132 which is part of the lower half bearing case 70.

Referring now to FIG. 2, flange 12 has flange bores 18 extending vertically through flange 12. A rod 20, having a diameter less than the width of flange bore 18, attached at its first end to outboard lug 2 of bearing case 66, protrudes downwardly from the lower surface of outboard lug 2 and through flange bore 18.

During operation of the turbomachine, the temperature of inboard end portion 84 of bearing case 66 becomes greater than the temperature of outboard end portion 120 of bearing case 66. This results in the temperature of inboard supports 86 and 88 becoming greater than the temperature of outboard supports 121 and 122. The increase in temperature of flex plates 90 and 92 results in an increase in their vertical length and thus an increase in the vertical height of inboard end portion 84 of bearing case 66, as represented by the vertical position of inboard lugs 102. Although the operating temperatures of outboard supports 121 and 122 result in an increase in the vertical length of outboard vertical support member 128, such increase is less than the increase in the vertical length of flex plates 90 and 92. The greater expansion of inboard supports 86 and 88 relative to the outboard supports 121 and 122, may cause bearing case 66 to move upward relative to flange 12 on which it normally rests through outboard support arm 132 and outboard lug 2. Since rod 20 is free to move vertically upward relative to flange 12, the lower surface of outboard lug 2 responds to the expansion of inboard supports 86 and 88 by lifting off flange 12. Thus, during operation of the turbomachine at elevated temperatures, the end portion of shaft 50 enclosed by bearing case 66 is maintained in alignment with the centerline of bearing case 66.

During a cool down operation of the turbomachine following an operation at elevated temperatures, the temperature of inboard end portion 84 of bearing case 66 decreases, resulting in a corresponding decrease in the temperature of inboard supports 86 and 88. As a result, the vertical height of inboard end portion 84 of bearing case 66, as represented by the vertical height of inboard lugs 102, decreases. The decrease in vertical height of inboard end portion 84 may result in a corresponding decrease in the vertical height of outboard end portion 120 of bearing case 66. Since this decrease is greater than any decrease in the length of outboard supports 121 and 122, outboard lugs 2 move downward relative to flange 12 until the lower surface of lug 2 is once again supportingly contacted with flange 12. Accordingly, during a cool down operation, the end portion of shaft 50 enclosed by bearing case 66 is maintained in alignment with the centerline of bearing case 66.

Horizontal movement of the bearing case is restrained by rod 20 engaging the walls of flange bore 18. To ensure that undesirable horizontal motion is restrained when outboard lug 2 has lifted off flange 12, rod 20 should extend downward from the bottom surface of lug 2 at least a distance sufficient to prevent lower end of rod 20 from disengaging from flange bore 18.

To prevent some event from causing lug 2 to move vertically upward an unexpected distance sufficient to disengage rod 20 from flange bore 18, outboard supports 121 and 122 can optionally further comprise retainer 26. Retainer 26 is attached to the second end of rod 20 and is configured and positioned so that it cannot pass vertically upward through flange bore 18. As illustrated in FIG. 2, retainer 26 can be a threaded nut mounted on the second end of rod 20 and having an outside diameter greater than the width of flange bore 18. Alternatively, as depicted in FIG. 3, retainer 26 can be a washer having an outside diameter greater than the width of flange bore 18. The washer has an inside diameter greater than the diameter of rod 20, is mounted on rod 20, and is held in position with threaded nut 34.

As shown in FIG. 2, retainer 26 is positioned on rod 20 to create gap 30 between retainer 26's upper surface and flange 12's lower surface. The size of gap 30 should be sufficiently large to accommodate normal vertical movement of lug 2 (previously referred to in discussing FIGS. 1–4 as weight 2) relative to flange 12. Such movement is caused by differential thermal expansion, as discussed above, or by other normal lifting forces, such as centering forces from engagement of the turning gear clutch 118. If bearing case 66 were to lift unexpectedly more than the size of gap 30, retainer 26 would restrain such movement once it exceeded the size of gap 30.

Turning now to FIG. 4, the turbomachine of the present invention can optionally further comprise a spacer 36 mounted on rod 20 and inside flange bore 18. Spacer 36 is fitted between retainer 26 and the lower surface of outboard lug 2 and has a length greater than the thickness of flange 12. Spacer 36 is preferably clamped against the lower surface of outboard lug 2 by retainer 26. When, as depicted in FIG. 4, retainer 26 is a washer held in position by threaded nut 34 mounted on rod 20, spacer 36 can be clamped against the lower surface of outboard lug 2 by tightening threaded nut 34. As one skilled in the art will note, the difference between the length of spacer 36 and the thickness of flange 12 defines the size of gap 30. In this manner, selection of a particular length of spacer 36 permits precise sizing of gap 30 and allows the size of gap 30 to be easily changed.

If it becomes desirable to completely restrict vertical movement of the outboard lug 2 relative to flange 12, in cases where no spacer is employed and the retainer is a nut (as depicted in FIG. 2) or a washer secured by a nut (as depicted in FIG. 3), vertical immobilization can be effected simply by tightening nut 26 or 34 to urge retainer 26 against the lower surface of flange 12 thus drawing outboard lug 2 (through rod 20) downward and against the upper surface of flange 12.

Where a spacer is employed, vertical immobilization can be effected by introducing a shim having a thickness greater than the size of gap 30 between the upper surface of retainer 26 and the lower surface of flange 12 and tightening retainer 26 (in the case where retainer 26 is a threaded nut) or nut 34 securing retainer 26 (in the case where the retainer is a washer).

Figure 12:
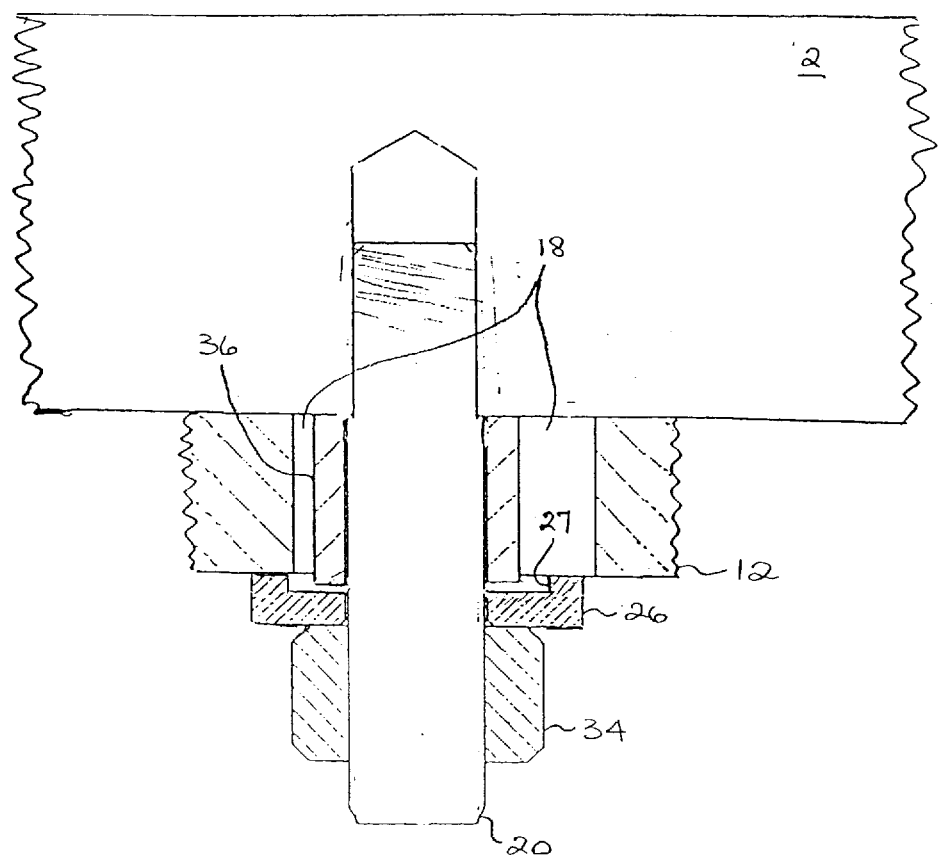
FIG. 12 is an enlarged side cross-sectional view of the alternative embodiment of the support in accordance with the present invention.

Alternatively, again in cases where spacers are employed, retainer 26 can be constructed such that it is one with the shim. For example, in cases where retainer 26 is a washer, washer 26 can have protrusion 27 on one of its faces as depicted in FIGS. 4 and 12. Protrusion 27 should extend beyond the washer face a height greater than the size of gap 30. Further, protrusion 27 should be positioned on the face of washer 26 so that it does not obstruct rotation of nut 34 when washer 26 is oriented with protrusion 27 facing away from flange 12, as illustrated in FIG. 4. In addition, protrusion 27 should be positioned so that it does not contact spacer 36 when washer 26, oriented with protrusion 27 facing toward flange 12, as depicted in FIG. 12, is drawn upward along rod 20 toward the lower surface of flange 12.

Referring to FIG. 4, in normal operation of the support, the face of washer 26 having protrusion 27 faces away from flange 12 and toward nut 34. In this mode, tightening nut 34 draws retainer 26 against spacer 36, thereby clamping retainer 26 and spacer 36 against outboard lug 2, and permitting vertical upward movement of outboard lug 2 relative to flange 12 to the extent of the size of gap 30.

Referring now to FIG. 12, when it is desired that outboard lug 2 be clamped to flange 12 to prevent relative vertical movement, as might be the case during transportation of the turbomachine, washer 26 and nut 34 are removed, and washer 26 is flipped over so that the face of washer 26 having protrusion 27 faces the bottom surface of flange 12. Tightening nut 34 draws washer 26 upward until protrusion 27, having a height greater than the length of spacer 36 less the thickness of flange 12, is urged against the lower surface of flange 12, thus clamping the lower surface of outboard lug 2 against the upper surface of flange 12.

In cases where retainer 26 is a threaded nut, immobilization also can be effected by providing the nut with a protrusion on one of its faces. Design considerations of such a nut are the same as those discussed above with regard to protrusion-containing washer retainers.

As indicated above, the operating temperatures of the turbomachine also result in an increase in the length of shaft 50 and the length of housing 40 in a direction parallel to the longitudinal axis of shaft 50. As the low pressure exhaust end portion 54 of housing 40 is mounted on vertical supports 60 which prevent longitudinal movement of the low pressure exhaust end portion 54 of housing 40, any increase in axial length of housing 40 appears at the inboard end portion 84 of bearing case 66. This causes flex plates 90 and 92 to flex to the right, as viewed in FIG. 7, thereby causing bearing case 66, outboard support arm 132, and outboard lug 2 to also move to the right. This longitudinal expansion can be accommodated by flange bores 18 elongated in the direction parallel to shaft 50 (see FIG. 5). Since, in normal operation, outboard support 121 is not clamped to bearing case 66, longitudinal movement of bearing case 66 relative to the outboard support 121 would require only overcoming sliding friction between outboard lug 2 and flange 12, the magnitude of which would be reduced at operating temperatures when outboard lug 2 has lifted off flange 12. Consequently, although outboard vertical support members 128 of outboard supports 121 have been depicted as having construction similar to that of flex plates 90 and 92 of inboard supports 86 and 88, they can be designed to resist flexing.

Other than as described above, the positions of the various supports are not critical to the operation of the present invention. For example, vertical supports 60, depicted in FIG. 6 as being inboard of exhaust steam outlet 56, can, alternatively, be positioned outboard of exhaust steam outlet 56 or under exhaust end bearing housing 55. Likewise, the exact position of outboard supports 121 is not critical. However, in some cases, depending on the position of outboard supports 121 and the weight and weight distribution of the various components of turbine housing 40, bearing case 66, and turning gear mechanism 82, it may be advantageous to provide additional support under turning gear mechanism 82.

Although the invention has been described for the purpose of illustration, it is understood that such detail is solely for that purpose and variations can be made therein by those skilled in the art without departing from the spirit and scope of the invention.

What is claimed:

1. A support for a weight having a bottom surface comprising:
    a flange having a flange bore, having a width;
    a base connected to and positioned below said flange; and
    a rod having a diameter less than the flange bore width, said rod having a first end attached to said weight and a second end protruding downwardly from said weight's bottom surface and through said flange bore, wherein said flange is moveable relative to the weight.
2. A support according to claim 1 further comprising:
    a retainer attached to the second end of said rod and positioned such that said retainer cannot pass vertically upward through the flange bore.
3. A support according to claim 2, wherein the second end of said rod is threaded and wherein said retainer is a threaded nut mounted on said rod's second end, the threaded nut having an outside diameter greater than the flange bore width.
4. A support according to claim 2, wherein the second end of said rod is threaded and wherein said retainer is a washer mounted on said rod and held in position with a threaded nut also mounted on the second end of said rod, the washer having an outside diameter greater than the flange bore width.
5. A support according to claim 2, wherein said flange has a flange thickness and said support further comprises a spacer mounted on said rod and inside the flange bore, fitted between said retainer and said weight, and having a length greater than the flange thickness.
6. A support according to claim 5, wherein the spacer is integral with said rod.
7. A support according to claim 5, wherein the second end of said rod is threaded and wherein said retainer is a threaded nut mounted on the second end of said rod, the threaded nut having an outside diameter greater than the flange bore width.
8. A support according to claim 7, wherein the spacer is integral with the threaded nut.
9. A support according to claim 5, wherein the second end of said rod is threaded and wherein said retainer is a washer mounted on said rod and held in position with a threaded nut also mounted on the second end of said rod, the washer having an outside diameter greater than the flange bore width.
10. A support according to claim 9, wherein the spacer is integral with the washer.
11. A support according to claim 9, wherein the washer has an upper face in contact with the spacer, a lower face in contact with the nut, and a protrusion on the lower face of the washer positioned to permit the nut to rotate without contacting the protrusion.
12. A turbomachine comprising a housing containing a rotor with a longitudinally-extending shaft, a bearing case containing a bearing to support the shaft and positioned adjacent to said housing, and a support system positioned beneath said bearing case, said support system comprising:
    a flange having a flange bore having a width and supportingly contacting said bearing case;
    a base connected to and positioned below said flange; and
    a rod having a diameter less than the flange bore width, said rod having a first end attached to said bearing case and a second end protruding downwardly from said bearing case and through the flange bore, wherein said flange is moveable relative to the bearing case.
13. A turbomachine according to claim 12, wherein said support system further comprises:
    a retainer attached to the second end of said rod and positioned such that said retainer cannot pass vertically upward through the flange bore.
14. A turbomachine according to claim 13, wherein the second end of said rod is threaded and wherein said retainer is a threaded nut mounted on said rod's second end, the threaded nut having an outside diameter greater than the flange bore width.
15. A turbomachine according to claim 13, wherein the second end of said rod is threaded and wherein said retainer is a washer mounted on said rod and held in position with a threaded nut also mounted on the second end of said rod, the washer having an outside diameter greater than the flange bore width.
16. A turbomachine according to claim 13, wherein said flange has a flange thickness and said support system further comprises a spacer mounted on said rod and inside the flange bore, fitted between said retainer and said weight, and having a length greater than the flange thickness.

17. A turbomachine according to claim 16, wherein the second end of said rod is threaded and wherein said retainer is a threaded nut mounted on the second end of said rod, the threaded nut having an outside diameter greater than the flange bore width.

18. A turbomachine according to claim 16, wherein the second end of said rod is threaded and wherein said retainer is a washer mounted on said rod and held in position with a threaded nut also mounted on the second end of said rod, the washer having an outside diameter greater than the flange bore width.

19. A turbomachine according to claim 18, wherein the washer has an upper face in contact with the spacer, a lower face in contact with the nut, and a protrusion on the lower face of the washer positioned to permit the nut to rotate without contacting the protrusion.

20. A turbomachine according to claim 12, wherein said support system comprises a plurality of supports positioned beneath said bearing case.

* * * * *